United States Patent
Szepesvary et al.

(10) Patent No.: US 7,895,583 B2
(45) Date of Patent: Feb. 22, 2011

(54) METHODS AND APPARATUS FOR GRAMMAR-BASED RECOGNITION OF USER-INTERFACE OBJECTS IN HTML APPLICATIONS

(75) Inventors: Attila Szepesvary, Szlacsanyi (HU); Gergely Szilvasy, King of Prussia, PA (US); Sandor Banki-Horvath, Torbagy u. (HU); Tamas Szvitacs, Banya (HU)

(73) Assignee: Oracle International Corporation, Redwood Shores, CA (US)

( * ) Notice: Subject to any disclaimer, the term of this patent is extended or adjusted under 35 U.S.C. 154(b) by 601 days.

(21) Appl. No.: 09/925,613

(22) Filed: Aug. 9, 2001

(65) Prior Publication Data
US 2003/0192026 A1 Oct. 9, 2003

Related U.S. Application Data

(60) Provisional application No. 60/258,081, filed on Dec. 22, 2000.

(51) Int. Cl.
G06F 9/45 (2006.01)
G06F 3/00 (2006.01)

(52) U.S. Cl. ........................ 717/143; 715/708
(58) Field of Classification Search ................. 717/100, 717/143; 345/760; 707/101, 500
See application file for complete search history.

(56) References Cited

U.S. PATENT DOCUMENTS

| | | | |
|---|---|---|---|
| 5,721,939 A | 2/1998 | Kaplan | |
| 5,862,325 A | 1/1999 | Reed et al. | |
| 5,933,140 A * | 8/1999 | Strahorn et al. | 715/712 |
| 5,991,539 A * | 11/1999 | Williams | 717/143 |
| 6,185,587 B1 | 2/2001 | Bernardo et al. | |
| 6,259,445 B1 | 7/2001 | Hennum et al. | |
| 6,275,227 B1 | 8/2001 | DeStefano | |
| 6,289,370 B1 | 9/2001 | Panarello et al. | |
| 6,307,544 B1 | 10/2001 | Harding | |
| 6,381,610 B1 | 4/2002 | Gundewar et al. | |
| 6,437,805 B1 | 8/2002 | Sojoodi et al. | |

(Continued)

FOREIGN PATENT DOCUMENTS

EP 1016982 7/2000

(Continued)

OTHER PUBLICATIONS

Aho, Sethi, and Ullman, "Compilers: Principles, Techniques, and Tools", 1986, Addison-Wesley, ISBN 0-201-10088-6, Chapter 4.*

(Continued)

Primary Examiner—James Rutten
(74) Attorney, Agent, or Firm—Townsend and Townsend and Crew LLP

(57) ABSTRACT

The present invention provides methods and system for building a computer program, such as a dynamically linked library, capable of recognizing graphical user interface objects in HTML applications. The program accepts HTML DOM structures as input and processes the DOM by 1) creating one or more tokens for each parsed DOM element, and 2) parsing the generated tokens according to an application specific grammar. The program outputs user-interface objects that correspond to the graphical elements and other items displayed in the web browser.

18 Claims, 6 Drawing Sheets

U.S. PATENT DOCUMENTS

| | | | |
|---|---|---|---|
| 6,467,081 | B2 | 10/2002 | Vaidyanathan et al. |
| 6,578,022 | B1 | 6/2003 | Foulger et al. |
| 6,622,144 | B1 * | 9/2003 | Rush, Jr. .................... 707/101 |
| 6,675,230 | B1 * | 1/2004 | Lewallen .................... 719/328 |
| 6,717,593 | B1 * | 4/2004 | Jennings .................... 345/760 |
| 2001/0032216 | A1 | 10/2001 | Duxbury |
| 2001/0034742 | A1 | 10/2001 | Stinson |
| 2001/0056504 | A1 * | 12/2001 | Kuznetsov .................. 709/310 |
| 2002/0091993 | A1 | 7/2002 | Walley et al. |
| 2002/0104068 | A1 * | 8/2002 | Barrett et al. ............... 717/104 |
| 2002/0107881 | A1 * | 8/2002 | Patel .......................... 707/500 |
| 2002/0130895 | A1 | 9/2002 | Brandt et al. |
| 2002/0156846 | A1 | 10/2002 | Rawat et al. |
| 2003/0001875 | A1 | 1/2003 | Black et al. |
| 2003/0084115 | A1 | 5/2003 | Wood et al. |
| 2003/0225825 | A1 * | 12/2003 | Healey et al. ............... 709/203 |
| 2003/0229854 | A1 * | 12/2003 | Lemay ........................ 715/513 |

FOREIGN PATENT DOCUMENTS

| | | |
|---|---|---|
| WO | WO 00/05643 | 2/2000 |
| WO | WO 00/17748 | 3/2000 |
| WO | WO 00/63783 | 10/2000 |

OTHER PUBLICATIONS

"HTML 4.01 Specification" Dec. 24, 1999, W3C, chapter 11, accessed Oct. 13, 2009 at <http://www.w3.org/TR/html4/struct/tables.html>.*

Jono, Bacon, et al: "Kafka Request for Comments 1—unknown Tags Parser " [online], Nov. 12, 2000, XP002288554, kafka.kde.org, retrieved from Internet: URL:http://kafka.kde.org/rfc/rfc1.htm, retrieved Jul. 5, 2004.

Liu L, et al.: "XWRAP" an XML-enabled wrapper construction system for Web information sources Data Engineering, 2000, Proceedings 16$^{th}$ International Conference in San Diego, CA, Feb. 29, 2000, pp. 611-621, XP010378758 ISBN: 0-7695-0506-6.

Aho A V et al.: "Compilers Principles, Techniques, and Tools" Compilers, Principles, Techniques and Tools, Reading, Addison-Wesley Publishing Co., US, 1986, XP002290677, pp. 216, 257-266.

W3C:"Document Object Model (DOM) Technical Reports" [Online], Nov. 13, 2000, XP002288766, http://www.w3.org/DOM/DOMTR, retrieved Jul. 14, 2004.

W3C: "Document Object Model (DOM) Level 2 Core Specification" [Online] Nov. 13, 2000, XP002290370, http://www.w3.org/TR/2000/REC-DOM-Level-2-Core-20001113, retrieved Jul. 29, 2004.

W3C: "XHTML? 1.0: The Extensible HyperText Markup Language" [Online], Jan. 26, 2000, XP002288767, http://www.w3.org/TR/2000/REC-xhtml1-2-0000126, retrieved Jul. 16, 2004.

Ian Oeschger: "XUL Programmer's Reference Manual" [Online], Apr. 8, 2000, XP0022887868, http://web.archive.org/web/20000408153408/http://www.mozilla.org/xpfe/xulref/XUL_Reference.html, retrieved Jul. 16, 2004.

International Search Report dated Jul. 30, 2003, for PCT/US03/09727, filed Mar. 28, 2003, 6 pgs.

* cited by examiner

METHODS AND APPARATUS FOR GRAMMAR-BASED RECOGNITION OF USER-INTERFACE OBJECTS IN HTML APPLICATIONS

REFERENCE TO RELATED APPLICATION

This application claims the benefit of priority of U.S. Ser. No. 60/258,081, filed on Dec. 22, 2000, entitled "METHODS AND APPARATUS FOR GRAMMAR-BASED RECOGNITION OF USER-INTERFACE OBJECTS IN HTML APPLICATIONS," the teachings of which are incorporated herein by reference.

BACKGROUND OF THE INVENTION

The invention pertains to computer graphical user interface software and, particularly, to the automated recognition of objects presented by such interfaces. The invention has application (by way of non-limiting example) in training aids, accessibility aids, and quality assurance for stand-alone software applications, as well as for Internet- and other computer network-based software applications.

Though the computer was invented over forty years ago, use of the ubiquitous device remains a challenge for most people. Bound paper manuals gave way to online help as the computer went mainstream in the early 1980's. Software publishers have since struggled to make context-sensitive help screens that are comprehensive yet simple, thereby meeting the demands of novices and seasoned users alike.

On another front, software publishers must continually check their releases to assure that program displays are complete and consistent, particularly, where user input or response is required. Only through such quality assurance can the publishers be confident that their software will be understood by users.

Responding to the needs of sight-impaired users presents a host of additional problems. Basic program screens and help displays may need to be magnified, visually revamped or played in audio. The size of the quality assurance task may, consequently, double.

These problems are further compounded by the decreased use of stand-alone applications and the corresponding increased reliance on remote applications that "execute" via users' web browsers. Solutions to many of the aforementioned problems applicable to local applications often prove inapplicable to remotely executed ones.

An object of this invention is to provide improved methods and apparatus for use of graphical user interfaces.

A more particular object is to provide such methods and apparatus as can be used with software training aids, accessibility aids, and quality assurance for Internet- and other computer network-based software applications, as well as for stand-alone local software applications.

A still further object is to provide such methods and apparatus as can be used with software applications that utilize HTML-based and other markup language-based graphical user interfaces.

A related object is to provide such methods as can be readily implemented at low-cost, and without consumption of undue processor or memory resources and with adequate performance.

SUMMARY OF THE INVENTION

The foregoing are among the objects attained by the invention, which provides methods and apparatus for grammar-based recognition of graphical user interface (UI) objects in an application executing on a web browser. This is achieved, according to one aspect of the invention, by parsing the application's underlying HTML (or other markup language) stream or document object model (DOM) in view of an application-specific grammar. Methods according to the invention can identify UI objects such as user input or selection fields, hyperlinks, and so forth, as well as properties of those objects, such as identifiers, content, shapes, locations, etc. Except where otherwise necessitated by context, the term UI object refers to objects, their identifiers and/or descriptors.

In a related aspect, the invention provides methods as described above that include scanning the HTML stream or DOM to identify tokens. These are parsed, based on the predefined grammar, to distinguish among UI objects as distinct from textual titles, metatags, unprintable HTML, in-line pictures and other "nonobjects."

By way of nonlimiting example, a system operating in accord with this aspect of the invention can be used to recognize customer name, home address, and other input fields (as well their content) displayed by a web browser (such as Microsoft Internet Explorer) while "pointing at" an Internet auction site web page. To this end, the system accesses the DOM created by the browser from the HTML stream representing that page. It identifies the aforementioned input fields by interpreting tokens discerned from the DOM in view of a grammar previously defined for that given application. Information regarding the position and content of those fields can be output, e.g., to a context-based "help" utility, or otherwise. Thus, by way of nonlimiting example, that information can be used in a system of the type modeled after the OnDemand Personal Navigator training system, commercially available from the assignee hereof.

Further aspects of the invention provide methods as described above that include scanning the DOM hierarchy maintained in a browser in response to an HTML stream, and creating a sequence of tokens for each DOM element. This can include grouping sequences of HTML DOM attributes into units (tokens) to create a mapping between the DOM elements and the tokens.

Further aspects of the invention provide methods as described above in which the tokens are parsed to find the HTML document structure as described by its predefined grammar. This can include grouping the tokens into syntactic structures that identify items displayed in the HTML application. Continuing the example above, the identified structures can be the customer name, home address and other input fields of the auction page.

Related aspects of the invention provide methods as discussed above, in which the parsing step includes searching for patterns of similarly formatted HTML elements, such as classnames, font size, style, tag color, and size. The parsing step then generates a list of UI objects that represents the displayed items.

In another aspect, the invention provides methods as discussed above that include determining the URLs (or portions thereof) underlying the HTML pages displayed by the browser. Those URLs (or portions) are used to facilitate identifying and distinguishing among UI objects contained on those pages.

Further aspects of the invention provide methods for generating programming instructions or other code embodying the foregoing. Such methods can include creating a source input file containing the aforementioned grammar, e.g., which can serve as an input to an automated parser generator tool.

Yet still further aspects of the invention provide methods as described above for use with markup languages other than HTML, such as XHTML and XUL, by way of non-limiting example.

Further aspects of the invention provide digital data processing systems operating in accord with the above-described method.

Still further aspects of the invention provide systems paralleling the operation described above. These and other aspects of the invention are evident in the drawings, description, and claims that follow.

BRIEF DESCRIPTION OF THE DRAWINGS

A more complete understanding of the invention may be attained by reference to the drawings, in which.

DETAILED DESCRIPTION

The present invention provides methods and systems for recognizing user interface objects in HTML applications, as well as for creating computer programs that comprise those methods and systems. Computer programs built using the disclosed method accept HTML Document Object Model (DOM) structures as input and provide a list of user interface (UI) objects as output. Alternative methods utilize HTML streams in lieu of, or in addition to, the HTML DOM. Regardless, the approach to UI object recognition is grammar-based.

At the outset, it will be appreciated that DOM is a platform-neutral and language-neutral interface that allows computer programs and scripts to dynamically access and update the content, structure and style of web documents. DOM is a World Wide Web Consortium (W3C) recommended specification. Internet Explorer, Netscape Navigator and all other DOM-compliant browsers implement the interfaces and functions defined by the DOM specification so that programs and scripts can access and update the HTML content loaded into the browser. When the browser loads an HTML document, it creates an internal runtime representation of it. Methods and systems according to the invention capitalize on the DOM interfaces exposed by the browsers, to access this runtime representation of the HTML document.

The content and structure of the DOM is similar to the original HTML. Thus, the DOM is a hierarchical structure of the HTML tags (called HTML elements in DOM terminology) listing all the HTML attributes. In this light, though the illustrated embodiment processes the current state of the HTML document by accessing the document's runtime representation, alternative embodiments may process the HTML stream directly. The context of a displayed page, e.g., as indicated by URL, is also utilized to facilitate applying grammar interpretation. Applications that do not provide this distinguishing characteristic require empirical examination to identify other distinguishing features that determine context.

Those skilled in the art will understand that accessing the runtime state of the document through DOM, and not its HTML source, has certain advantages. First, certain properties of documents are only available when they are displayed by a specific browser. Examples of such properties include, the exact and current screen position of rendered elements, the current state of a check box, the current content of an edit field, etc. Second, documents are also dynamic structurally, that is, they can be changed by script interfaces such as JavaScript and VBScript that are embedded in the HTML text. This allows new HTML tags to be inserted, existing tags to be modified or removed as the scripts respond to user interactions.

Figure 1:
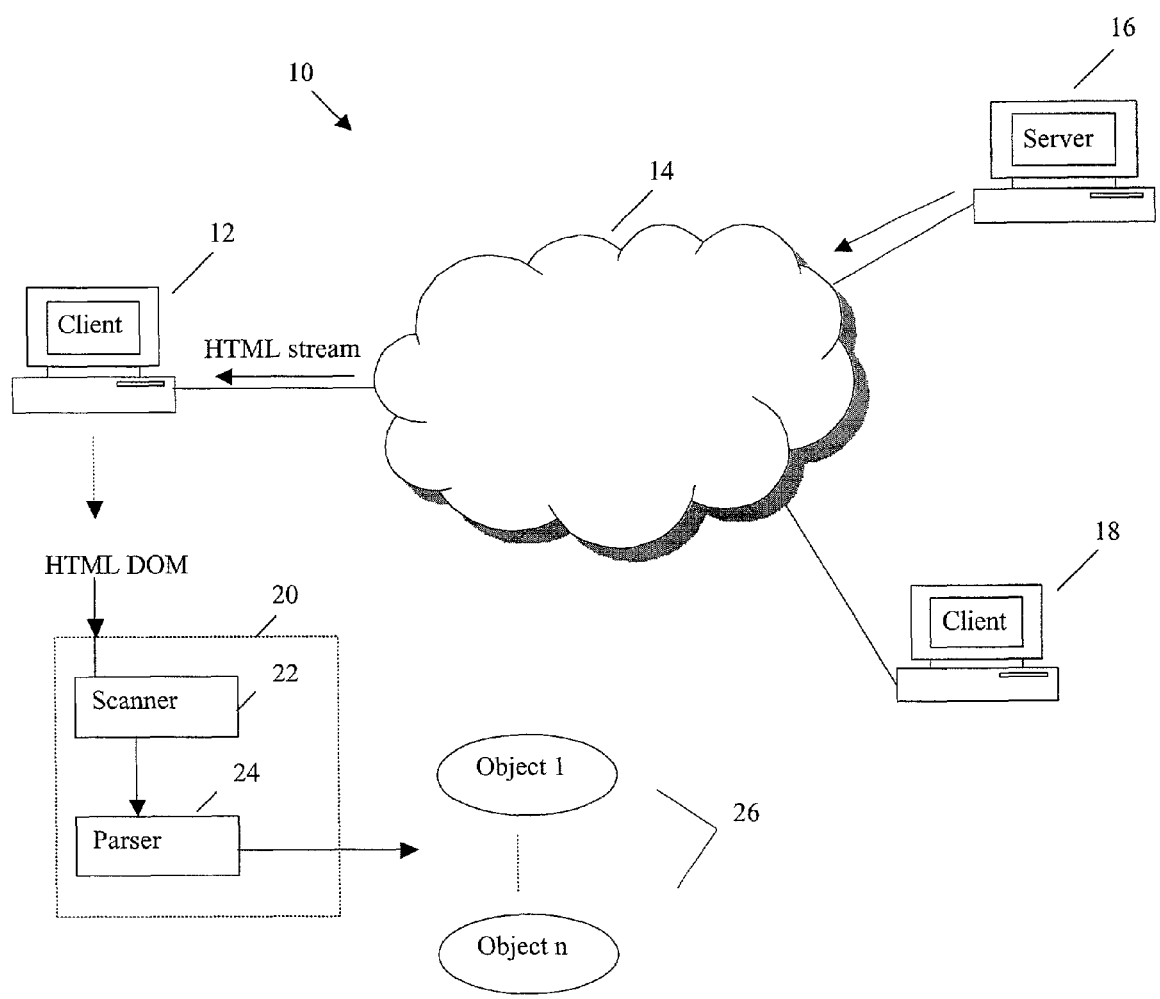
FIG. 1 depicts the architecture of a digital data processing system that utilizes a grammar-based user interface object recognition system according to the invention.

In view of the foregoing, FIG. 1 depicts an environment 10 in which the invention can be utilized. A digital data processor 16 "serves" HTML applications over a network 14. This can be an intranet, extranet, Internet or other network that supports HTML applications. Web browsers executing on client digital data processors 12 and 18 process HTML streams received from the server 16 to display text, pictures, video, hyperlinks and other output, while accepting text, user selections and other input, all in the conventional manner. In the illustrated embodiment, scanner module 22, parser 24 and other functionality executing on or in connection with the client devices 12, 18 (or, optionally, in connection with the server 16) access the HTML DOM structure to identify UI objects displayed by the browsers executing on those respective devices.

To this end, illustrated scanner module 22 traverses the DOM and creates one or more tokens for each element encountered. The process involves grouping sequences of attributes from the HTML DOM into units (tokens) to create a mapping between the DOM elements and the tokens. The generated tokens, which represent the DOM elements, are then passed to the parser 24.

The tokenized input is interpreted by the parser 24 according to an application specific grammar, to identify and distinguish among the various portions of the application's display. For example, recognizing interactive objects as distinct from textual titles, metatags, unprintable HTML, in-line pictures, etc. The parser can achieve this by grouping the tokens into syntactic structures that identify items displayed in the HTML application. The parser 24 then outputs user interface objects 26 that correspond to graphical elements and other items displayed by the browser.

Figure 2:
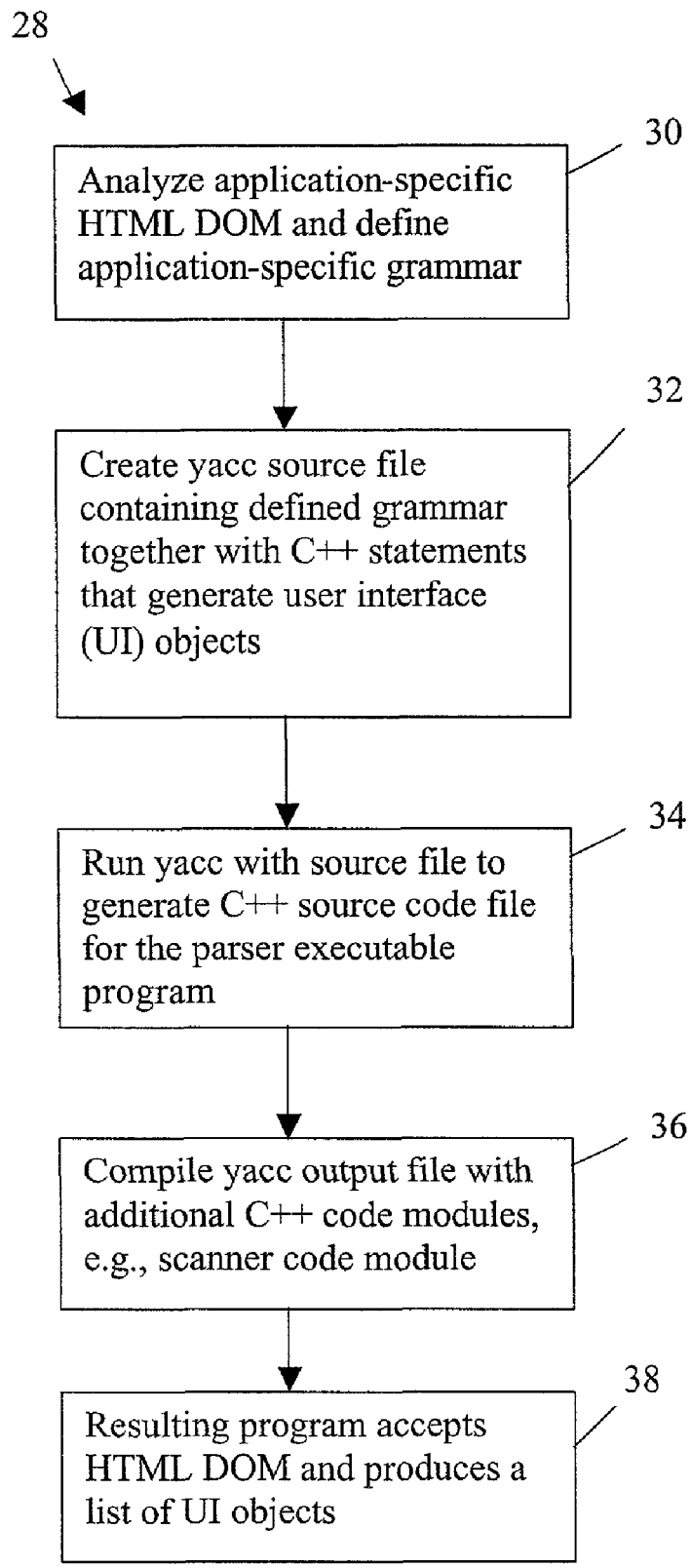
FIG. 2 is a flow chart that depicts generating a computer program according to the invention.

FIG. 2 is a flow chart 28 that depicts various steps for implementing this exemplary embodiment of the method of the invention. In step 30, the DOM of a specific application is analyzed and an application-specific grammar is defined. It is important to note that the defined grammar is not a generic grammar for all HTML DOM applications, rather, the defined grammar is specific to a particular application only.

Web designers usually reveal something about their web pages by using style-sheets and attaching style-classes to HTML tags. Such items are useful in defining the grammar of a specific application. Style-names are usually based on the purpose of the HTML tags, because the reason for using style-sheets is to ensure a common look-and-feel of web pages.

For example, a generic SPAN tag, which is used to create a button-like user interface element on the browser, might be given a certain classname by specifying the class attribute for the SPAN tag to ensure that all buttons look the same. This gives a very useful hint about the use of the specific HTML tag. If something like <SPAN CLASS=button> is identified during traversal of the DOM hierarchy, then this construct would be identified as a button-like user interface element on the browser.

The grammar can be defined for a particular application based on this and similar information. If the particular application does not utilize style-sheets, the DOM hierarchy is parsed searching for patterns of similarly formatted HTML elements such as font size, style, tag color, size, etc.

There is a close correlation between the look and intended use of HTML tags. The task is to distinguish between the various user interface elements on the browser by filtering, joining, and classifying HTML tags into user interface objects. Web designers do the same task in the opposite direction. They have certain user interface objects that they turn into HTML tags. They might choose to use cascading style-sheets for this purpose or they might format HTML tags individually.

The end result is the same, user interface objects of a certain class will produce a recurring pattern of HTML tags in the document. The method of the invention can be used to build a parser that recognizes these patterns based on style-sheet classes or patterns of similarly formatted HTML elements.

In step 32, a source file is created for the well known parser generator, Yet Another Compiler-Compiler (YACC), though practice of the invention is not so limited. Those skilled in the art are fully aware that parsers can be hand-programmed or built with other commonly available tools. YACC produces a parser which is a C/C++ program. This C/C++ program can be compiled and linked with other source code modules, including scanner and DOM traversal modules.

The YACC input source file contains an application specific grammar together with C++ statements for outputting UI objects. Those of ordinary skill in the art are very familiar with the workings and notation of YACC, however the following peripheral coverage may be useful. The definitions section of the source file can contain the typical things found at the top of a C program: constant definitions, structure declarations, include statements, and user variable definitions. Tokens may also be defined in this section.

The rules section of the YACC source file contains the application-specific grammar. The left-hand side is separated from the right-hand side by a colon. The actions may appear interspersed in the right-hand side; this means they will be executed when all the tokens or nonterminals to the action's left are shifted. If the action occurs after a production, it will be invoked when a reduction of the right-hand side to the left-hand side of a production is made.

Figure 7:
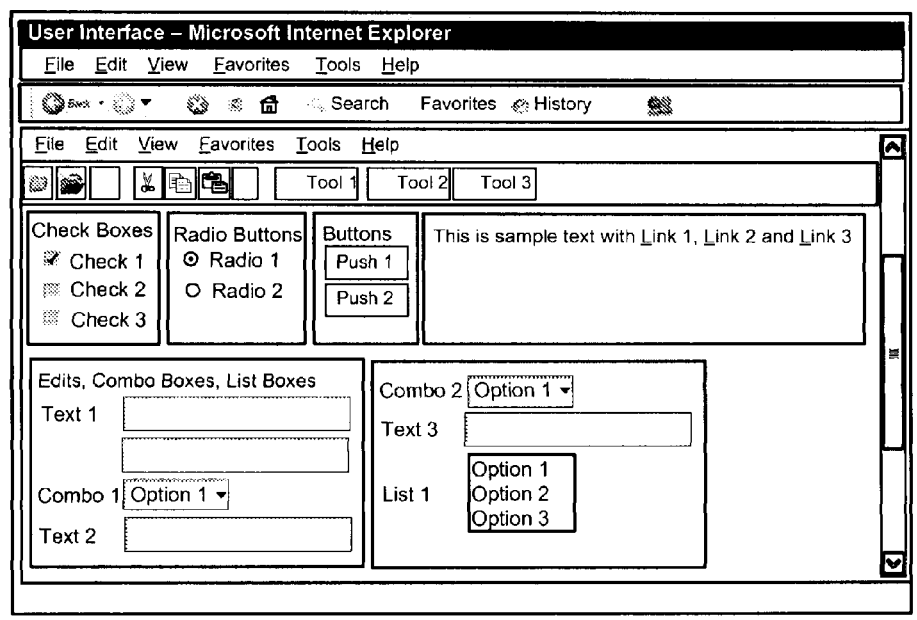
FIG. 7 depicts a screenshot of a hypothetical HTML application.

The following is a non-limiting example of a parser built for a hypothetical HTML application. FIG. 7 depicts a screenshot of the application. Presented in Appendix A is the underlying HTML source and presented in Appendix B is an annotated YACC source file excerpt with C++ action code.

Referring again to FIG. 2, in step 34, YACC is run with its input source file to generate C++ source code. The code generated by YACC can be altered before compiling and executing. The parser produced by YACC is a LALR(1) parser. A LR(1) parser can also be used instead. In these regards, those skilled in the art will appreciate that an LR(1)/LALR(1) grammar is the preferred, because it supports processing of an input stream in one pass. This characteristic results in increased performance (high speed), e.g., of the type necessary for use with a real-time application. YACC is an acceptable tool for use herein because it readily supports LR(1)/LALR(1) grammars.

In step 36, the YACC generated code is combined with the C++ code implementing the other remaining functionality (scanner module, DOM traversal module, etc.) and compiled with a C++ compiler. The resulting program, depicted by step 38, accepts HTML DOM as input and produces a list of UI objects as output that correspond to items and graphical elements displayed in the browser. In an ideal embodiment the generated program is a browser applicable Dynamically Linked Library (DLL).

Figure 3:
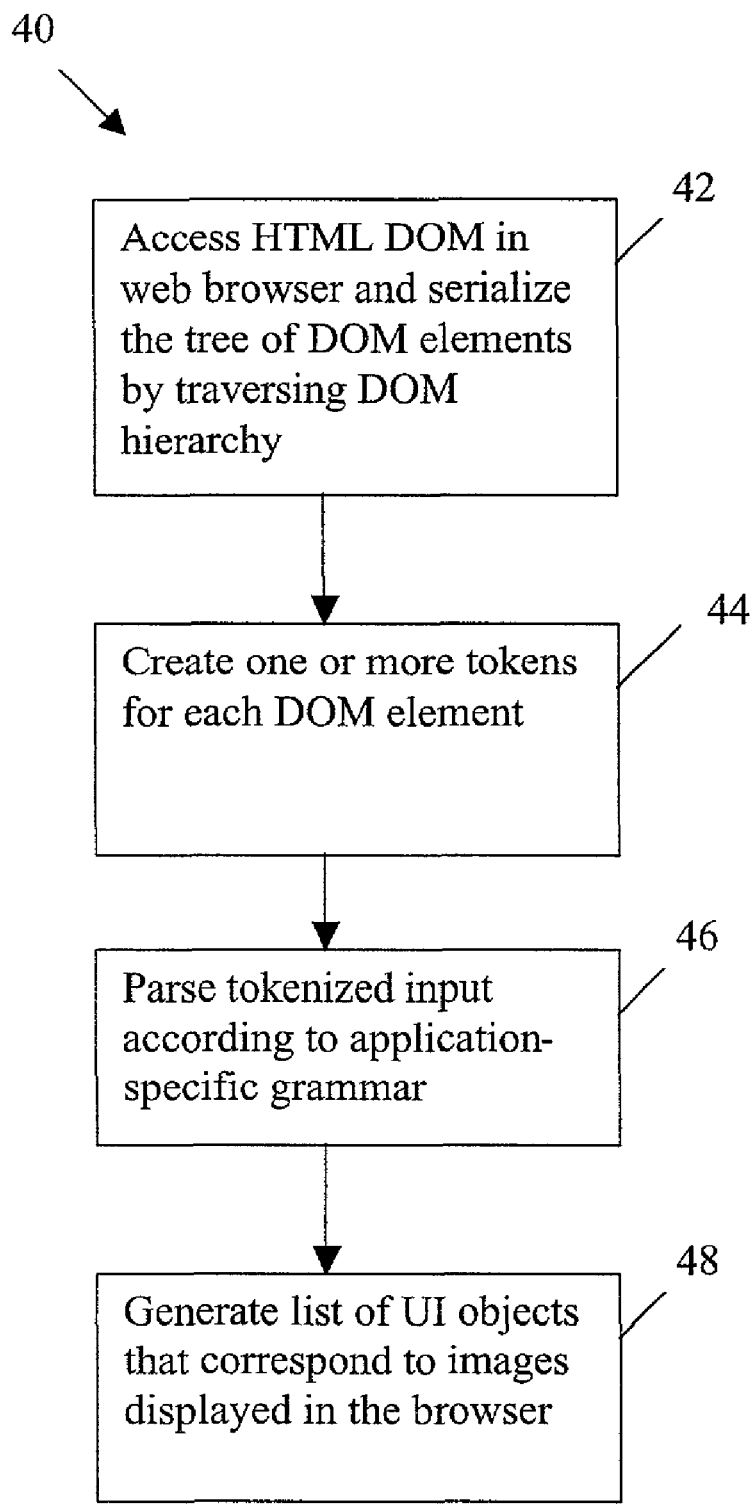
FIG. 3 is a flow chart that depicts the operation of the generated program of FIG. 2.

FIG. 3 illustrates a flow chart 40 that depicts the various steps of the generated program's operation. In step 42, the program accesses the HTML DOM in a web browser and serializes the tree of DOM elements by traversing the DOM hierarchy. The method of gaining access to the DOM may differ among web browsers. Therefore, the traversal code may need to be implemented somewhat differently depending on the browser being used.

An example that illustrates the above point is the accessing of DOM in the Microsoft Internet Explorer browser. Internet Explorer uses a component object model (COM) based implementation of DOM. By gaining access to the browser's COM interface the invention gains access to the DOM of the currently loaded document. Access to the browser's COM interface is gained by loading a so-called browser helper object into the browser. This is a fine point and is not a limitation of the invention. Those skilled in the art are aware that it is certainly possible to gain access and traverse DOM because of its standardized architecture. The result of the DOM traversal is a sequence of DOM elements with the capability to access the various properties of each element e.g. HTML attributes.

The HTML DOM elements are then processed. In step 44, the program creates one or more tokens for each DOM element. These tokens are used to represent the DOM elements in the parser. The tokens are created by the scanner depicted in FIG. 1 as item 22, and in FIG. 6 as item 72. Compared to the task of compiling programming languages this is the step of lexical analysis.

A sequence of tokens is created for each DOM element processed, because the aim of the program is to create logical UI objects out of DOM elements. In general, one token is generated for each DOM element and additional tokens are generated before every first and after every last child of a DOM element. It is possible, although usually not necessary, to create multiple tokens for certain DOM elements. The amount of information that goes into every token is application-dependent. In the case of HTML/CSS-based applications, it is a good starting point to have a unique token per HTML element and the element's classname.

In step 46, the program parses the tokenized input according to the application-specific grammar. Bottom-up left-to-right syntactical analysis is used. Because of the run-time sensitivity of the problem, a LR(1) or preferably LALR(1) parser is built as discussed above.

Finally, as depicted in step 48, the program outputs a list of UI objects that correspond to graphical elements displayed in the browser. It should be noted that the generated program is a stand-alone module that simply inputs HTML DOM and outputs a list of UI objects.

Figure 4:
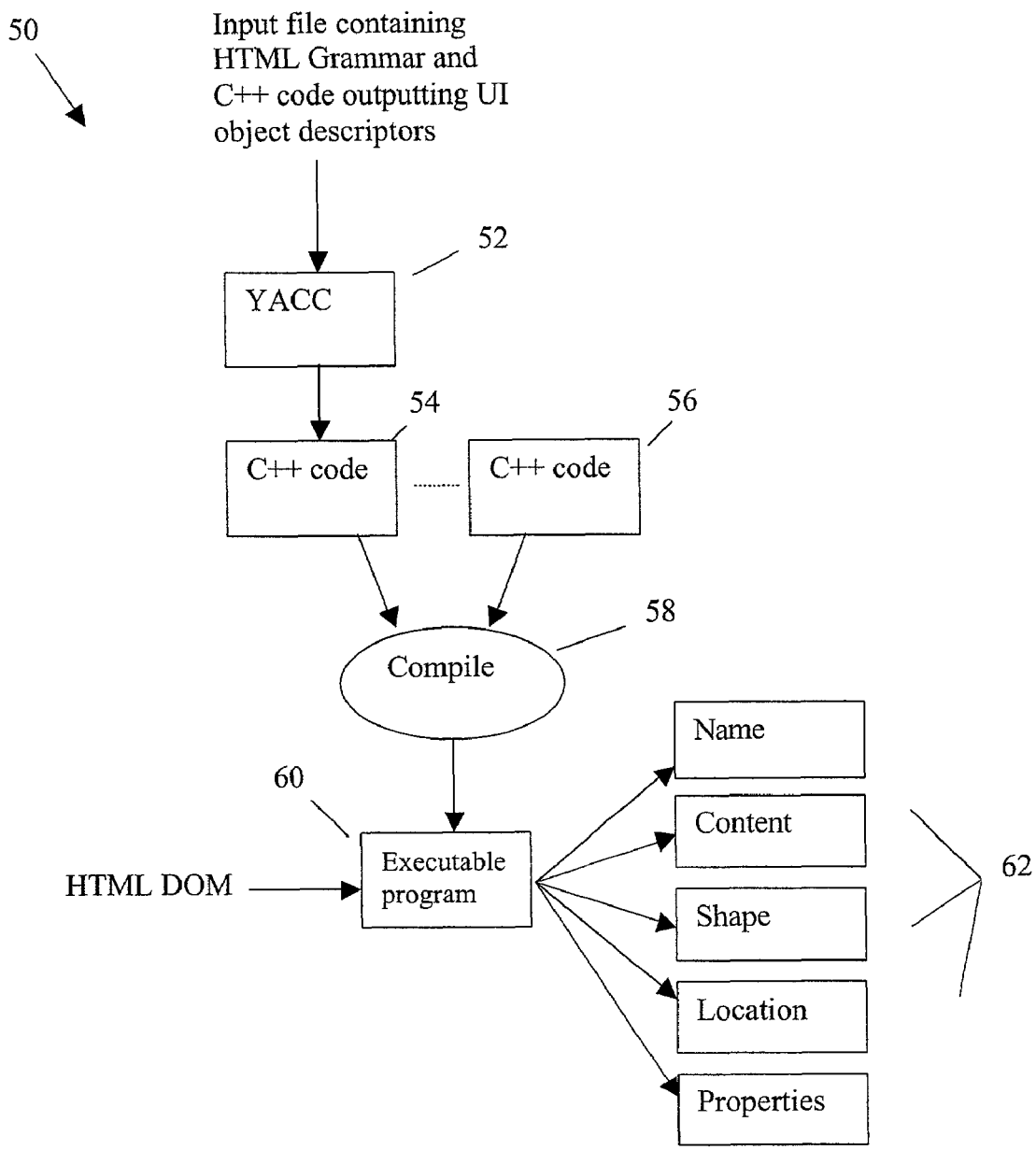
FIG. 4 depicts the generation and operation of a program according to the invention using YACC to generate C++ code for the generated program.

FIG. 4 is a graphical representation 50 of the overall process. An input file containing an application-specific grammar and source code for outputting UI objects is input into YACC 52. A C++ source code module 54 is then generated. Alternatively, the source code for outputting UI objects can be added to the YACC output file 54 instead of including it in the input file containing the grammar. Additional code modules 56, such as a scanner module or DOM traversal module can then be compiled 58 with the YACC output file 54 to generate the program 60. In a preferred embodiment the executable program 60 is a DLL. As shown in FIG. 4, the executable program 60 accepts HTML DOM and generates UI objects 62 that correspond to graphical elements in the browser display.

Figure 5:
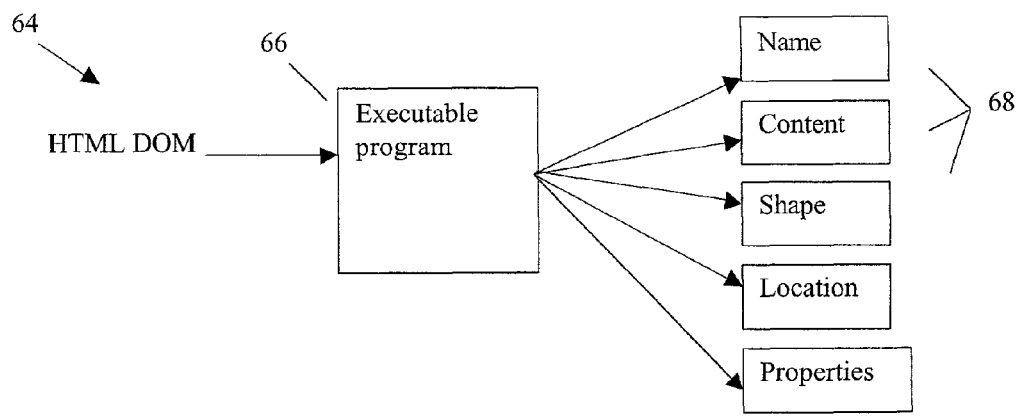
FIG. 5 is a graphical representation of the generated program as a stand-alone module that accepts HTML DOM and outputs user interface objects.

FIG. 5 is a graphical representation 64 of the executable program 66 as a stand-alone module, which parses a specific HTML DOM and generates UI objects 68. Examples of user interface object properties include: name, content, shape, location, and properties. The invention can be used with software training aids, accessibility aids, and quality assurance for stand-alone, Internet or other computer network-based software applications.

Figure 6:
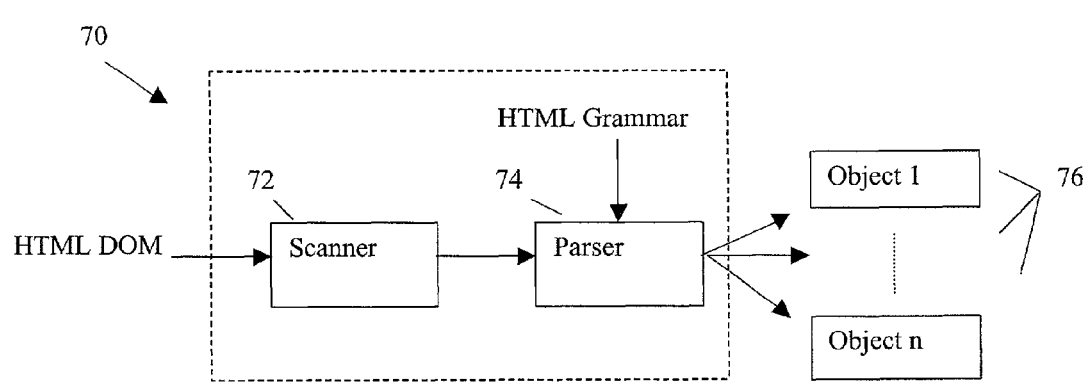
FIG. 6 is a graphical representation of further workings of the generated computer program, including the scanner module, parser module and object creation.

FIG. 6 depicts a graphical representation 70 of the inner workings of the generated program. The scanner module 72 accesses the HTML DOM and generates tokens for each DOM element that is encountered. These tokens are passed to the parser 74, which then interprets the tokenized input in accordance with the application specific grammar, and generates UI objects 76 that correspond to graphical elements displayed in the browser. In the illustrated embodiment, the application-specific grammar is already pre-defined and "on-board" the parser. However, those skilled in the art will appreciate that the parser can be reconfigured at run-time to reflect at least some changes in the grammar (e.g., using permutations of pre-loaded code snippets).

Illustrated below are C++ code samples that depict the tokens and corresponding HTML elements of a particular application. This code belongs to the scanner 72 part of the system 70. In the list of definitions there is a parser token on the left side associated with a HTML tag name and "classname" on the right side. This mapping is arbitrary and application-specific.

```
const CTokenData HTML_TOKENDATA[ ] = {
    { A, L"A#" },
    { BODY_UIBODY, L"BODY#uibody" },
    { IMG, L"IMG#" },
    { INPUT_button, L"INPUT_button#"},
    { INPUT_checkbox, L"INPUT_checkbox#"},
    { INPUT_radio, L"INPUT_radio#"},
    { INPUT_text, L"INPUT_text#" },
    { SELECT_UICOMBO, L"SELECT#uicombo" },
    { SELECT_UILISTBOX, L"SELECT#uilistbox" },
    { SPAN, L"SPAN#" },
    { SPAN_UILABEL, L"SPAN#uilabel" },
    { TD, L"TD#" },
    { TD_UIBTN, L"TD#uibtn" },
    { TD_UIBTNTXT, L"TD#uibtntxt" },
    { TD_UIMENUBAR, L"TD#uimenubar" },
    { TD_UIMENUITEM, L"TD#uimenuitem" },
    { TD_UITOOLBAR, L"TD#uitoolbar" },
    { TD_UIPANEL, L"TD#uipanel" }
};
```

The above embodiments are presented for illustrative purposes only. Those skilled in the art will appreciate that various modifications can be made to these embodiments without departing from the scope of the present invention. For example, hand-programmed parsers or parser generators other than YACC can be utilized and implemented by a system of the invention. By way of further example, the methods and systems according to the invention can be used to process HTML in contexts other than Internet-based, and client-server network applications. Thus, for example, they can be used to interpret UI objects displayed by a browser executing from an HTML file stored directly within a client device, e.g. a stand-alone HTML-based application. By way of further example, the invention can be used with mark-up languages other than HTML, e.g., XHTML, XUL.

In view of the foregoing, what is claimed is:

1. A computer-implemented method for identifying user interface (UI) objects in a markup-language stream, the method comprising:

receiving, from a server and at a client computer system, a web-based application for display in a web browser, the web-based application comprising one or more web pages;

analyzing the web-based application at the client computer system;

defining an application-specific grammar at the client computer system, based on analysis of the web-based application;

automatically generating a parser computer program at the client computer system, based on the application-specific grammar, using an automated parser generator tool;

scanning document object model (DOM) of the web-based application with the parser computer program to generate tokens;

parsing the tokens with the parser computer program to identify at least one graphical element in the web-based application;

outputting, from the parser computer program at the client computer system to a context-based help utility at the client computer system, information about position and content of the at least one graphical element identified by parsing the tokens in the web-based application; and providing context-based help based at least in part on the at least one graphical element in the web-based application.

2. The method of claim 1, wherein said markup-language stream drives a markup-language-based browser application, and wherein the scanning step includes scanning the DOM generated by a browser that displays that application.

3. The method of claim 1, wherein the scanning step includes identifying elements of the DOM by traversal thereof.

4. The method of claim 3, wherein the scanning step includes generating one or more tokens for each scanned DOM element.

5. The method of claim 1, wherein the at least one graphical element comprises one of a user input field, a text field, a metatag, unprintable markup-language, or an in-line image.

6. The method of claim 1, wherein the scanning and parsing steps are adapted to identify UI objects that correspond to elements displayed in the web-based application.

7. The method of claim 1, further comprising grouping the tokens into syntactic structures that identify items displayed by the web-based application.

8. The method of claim 7, wherein said step of grouping comprises identifying similarly formatted markup-language elements based on their markup-language attributes such as class name, font size, style, tag color, and size.

9. The method of claim 1, wherein said at least one graphical element comprises a name, content, a shape, or a location.

10. The method of claim 1, wherein automatically generating said the parser computer program comprises executing YACC ("Yet Another Compiler-Compiler").

11. The method of claim 1, wherein the parser computer program is a LALR(1) parser.

12. The method of claim 1, wherein the parser computer program is a LR(1) parser.

13. The method of claim 1, wherein the markup language is any of HTML, XHTML and XUL.

14. A digital data processing system comprising:
a client digital data processor at a client computer system, the client digital data processor being configured to:
receive, from a server and at the client computer system, a web-based application for display in a web browser, the web-based application comprising one or more web pages;
analyze the web-based application at the client computer system;
define an application-specific grammar at the client computer system, based on analysis of the web-based application;
automatically generate a parser computer program at the client computer system, based on the application-specific grammar, using an automated parser generator tool;
scan document object model (DOM) of the web-based application with the parser computer program to generate tokens;
parse the tokens with the parser computer program to identify at least one graphical element in the web-based application;
output, from the parser computer program at the client computer system to a context-based help utility at the client computer system, information about position and content of the at least one graphical element identified by parsing the tokens in the web-based application; and
provide context-based help based at least in part on the at least one graphical element in the web-based application.

15. The digital data processing system of claim 14, wherein said at least one graphical element each comprise name, content, shape, location, and properties.

16. The digital data processing system of claim 14, wherein said tokens are interpreted according to the application-specific grammar to identify and distinguish among UI objects of the web-based application's display.

17. The digital data processing system of claim 14, wherein the at least one graphical element comprises a user input field, a text field, a metatag, unprintable markup-language, or an in-line image.

18. The digital data processing system of claim 14, wherein the markup language is any of HTML, XHTML and XUL.

* * * * *

UNITED STATES PATENT AND TRADEMARK OFFICE
CERTIFICATE OF CORRECTION

| | | |
|---|---|---|
| PATENT NO. | : 7,895,583 B2 | Page 1 of 1 |
| APPLICATION NO. | : 09/925613 | |
| DATED | : February 22, 2011 | |
| INVENTOR(S) | : Szepesvary et al. | |

It is certified that error appears in the above-identified patent and that said Letters Patent is hereby corrected as shown below:

In column 1, line 14, before "BACKGROUND OF INVENTION"

insert

--Reference to Computer Program Listing Appendices

Appendix A is being filed as part of this application. The contents of Appendix A are being submitted in a 13-kilobyte file named "Appendix A.txt" that was created on January 14, 2011. The present application incorporates by reference for all purposes the entire contents of Appendix A.

Appendix B is being filed as part of this application. The contents of Appendix B are being submitted in a 14-kilobyte file named "Appendix B.txt" that was created on January 14, 2011. The present application incorporates by reference for all purposes the entire contents of Appendix B.--, therefore.

In column 1, line 26, delete "online" and insert -- on-line --, therefor.

In column 2, line 8, delete "hyperlinics," and insert -- hyperlinks, --, therefor.

In column 2, line 17, delete ""nonobjects."" and insert -- "non-objects." --, therefor.

In column 2, line 18, delete "nonlimiting" and insert -- non-limiting --, therefor.

In column 2, line 30, delete "nonlimiting" and insert -- non-limiting --, therefor.

Signed and Sealed this
Eleventh Day of October, 2011

David J. Kappos
*Director of the United States Patent and Trademark Office*